(12) United States Patent
Van Valkenburg

(10) Patent No.: US 7,984,563 B2
(45) Date of Patent: Jul. 26, 2011

(54) DEVICE FOR DETERMINING A DISTANCE FROM A REFERENCE SURFACE

(76) Inventor: Sjoerd Anne Van Valkenburg, The Hague (NL)

( * ) Notice: Subject to any disclaimer, the term of this patent is extended or adjusted under 35 U.S.C. 154(b) by 0 days.

(21) Appl. No.: 12/647,236

(22) Filed: Dec. 24, 2009

(65) Prior Publication Data

US 2010/0154235 A1  Jun. 24, 2010

Related U.S. Application Data

(60) Provisional application No. 61/140,765, filed on Dec. 24, 2008.

(51) Int. Cl.
*G01B 5/18* (2006.01)
*G01B 3/22* (2006.01)
(52) U.S. Cl. .................. 33/641; 33/638; 33/833
(58) Field of Classification Search .............. 33/641, 33/636, 638, 832, 833, 626, 836
See application file for complete search history.

(56) References Cited

U.S. PATENT DOCUMENTS

| | | | | |
|---|---|---|---|---|
| 3,645,002 | A * | 2/1972 | Hefti | 33/628 |
| 3,848,339 | A * | 11/1974 | Strasbaugh | 33/507 |
| 4,196,616 | A * | 4/1980 | Argabrite et al. | 73/81 |
| 4,642,900 | A * | 2/1987 | Provost et al. | 33/606 |
| 4,653,191 | A * | 3/1987 | Gasser | 33/833 |
| 4,894,920 | A * | 1/1990 | Butler et al. | 33/203.11 |
| 5,235,988 | A * | 8/1993 | Johnson et al. | 600/587 |
| 6,446,348 | B1 * | 9/2002 | Brian | 33/532 |
| 6,662,456 | B1 * | 12/2003 | Triplett | 33/203 |
| 6,978,552 | B1 * | 12/2005 | Sluder | 33/640 |
| 7,000,331 | B2 * | 2/2006 | Kennedy | 33/833 |
| 7,171,760 | B1 * | 2/2007 | Lemon | 33/833 |
| 7,762,005 | B2 * | 7/2010 | Pelotte | 33/836 |

* cited by examiner

*Primary Examiner* — Christopher W Fulton
(74) *Attorney, Agent, or Firm* — Young & Thompson

(57) ABSTRACT

A device for determining the distance of a cutting tool, for instance a router bit, relative to a first reference surface or a second reference surface, the second reference surface extending essentially perpendicular to the first reference surface. The device has a central body, a pair of feet mounted to the central body, the feet being spaced apart so as to be able to accommodate between them the cutting tool, and a pointing element slidably arranged relative to the central body. In a horizontal mode of operation, when the feet are placed on or against the first reference surface, the pointing element may be moved relative to the central body to abut the cutting tool for determining the distance between the cutting tool and the first reference surface. At least one of the feet is configured to set the height of the pointer element with respect to the second reference surface.

13 Claims, 3 Drawing Sheets

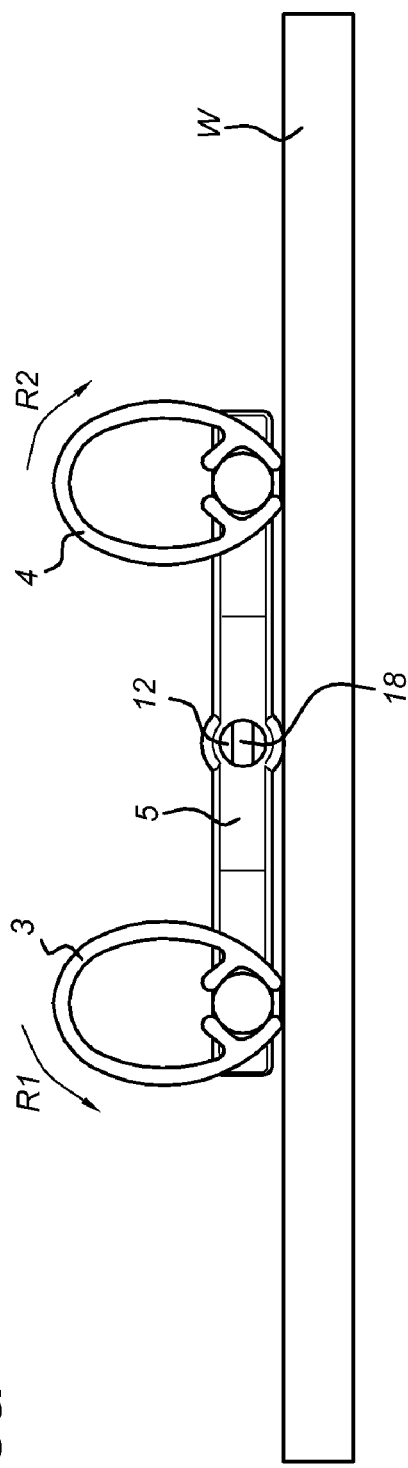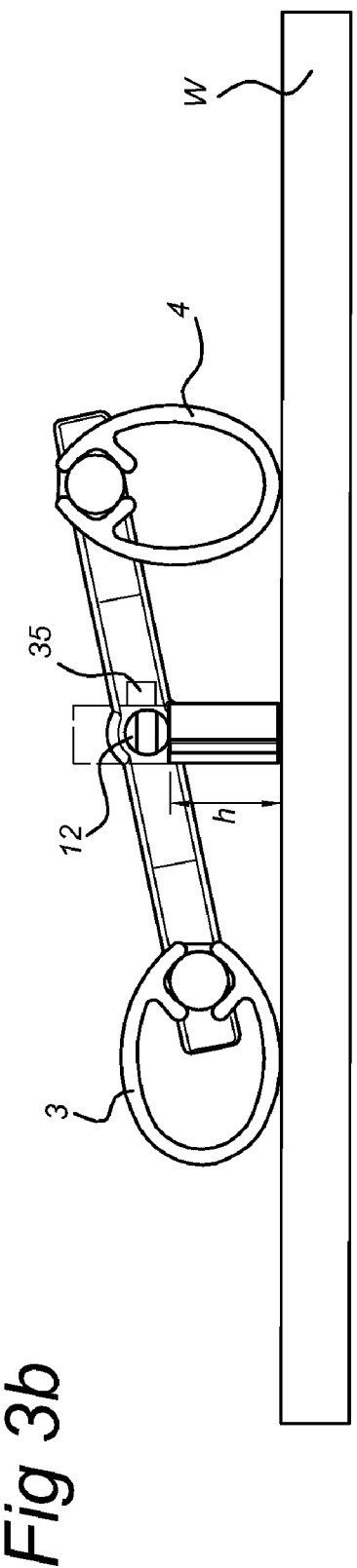
Fig 3a
Fig 3b

DEVICE FOR DETERMINING A DISTANCE FROM A REFERENCE SURFACE

BACKGROUND OF THE INVENTION

1. Field of the Invention

The present invention relates to a device for determining the distance of a cutting tool, for instance a router bit, relative to a reference surface.

2. Description of the Related Art

A router is a tool, especially used in the woodworking industry, used for milling out (hollow out) an area in the face of a piece of material (workpiece). Usually the material is wood or metal, but applying the router to other types of materials is also possible. There are several types of routers. Nowadays, most common types are spindle type routers (spindle routers), where a router bit is mounted onto a rotatable spindle of an electric motor.

A typical router set-up includes a frame for supporting a router table. The workpiece is supported by the table. The table has an opening through which a cutting tool, in this case a router bit, protrudes for machining the material. Different bit sizes and shapes can be used, and the bit is easily exchangeable. The bit is engaged by a collet provided with a clamping mechanism such as a number of clamps or jaws. The collet is part of a rotatable spindle that is connected to a motor drive for rotation. The router collet (and router bit mounted in the mouth of the collet) can be rotated around an axis perpendicular to the router table. Sometimes the collet may be able to move with respect to the table, for example, along the axis of rotation by a depth adjustment tool. In this case, the shape of the cut that is created is determined by the size and shape of the bit (cutter) held in the collet and the height of the bit relative to the upper surface of the router table.

A typical router system also includes a router fence. The router fence is placed on top of the table and is used as a stop along which the workpiece can be guided during the machining thereof to ensure that the proper part of the workpiece is cut away. The router fence is used as a directional tool during the processing of the workpiece.

Three important variables determining the router's work are: 1) the shape of the router bit (the cutter); 2) the height of the router bit (in most cases the router machine is held in a router lift, that allows easy vertical travel); and 3) the distance between the router bit and a fence placed on top of the router table and used as a stop along which the work piece can be guided during the machining thereof. Regarding the first variable, a large variety of different router bit shapes are on the market nowadays, allowing an almost indefinite shape to be routed to the workpiece. In the second variable, variation of the router bit height, determines how much of the wood is actually shaped. The variation may be accomplished by a depth adjustment tool, for example a router lift. The router lift allows the entire router machine to be cranked up or down with great precision, exposing more or less of the router bit above the router table. However, the handling of the third variable remains burdensome and is currently to a large extent a process of trial and error.

The determine the second variable, that is the height of the router bit or, more specifically, the height of the actual projection of a specific portion of the router bit, for instance a cutting edge, relative to a reference surface, for instance the upper surface of a router table, a variety of measuring tools is available. One of the methods of measuring the height of the router bit is by direct measurement of the distance from the upper surface of the router table to the cutting edge of the router bit. A measuring device for measuring the projection of the cutting edge of a router bit and/or for setting the router bit height is disclosed in GB 2 386 085 B. The device comprises a bridging cursor body provided with a steel rule or scale extending perpendicular to the body and passing through a hole provided therein to a datum formed by a line drawn between two feet which form the bases of the device. In use, the feet of the tool are set vertically upon the router table, so that the cursor body bridges the opening in the router table and the router bit projecting through the opening. The rule or scale is moved downward to contact the upper end surface of the router bit. The height of the upper end surface of the router bit can then by determined from reading the indication on the rule or scale that represents the height of the scale relative to the router table.

Instead of or additionally to measuring the height of the projection of the router bit relative to the router table, i.e. actually obtaining a measurement value of the relevant distance, the determination of the height may be also involve the movement of the position of the router bit to set the height of its projection to a predetermined value. In this case the device is used to set the cutting tool relative to the reference surface.

However, the known device can only be used to determine the distance between the upper end surface of the router bit relative to an essentially horizontal reference plane formed by the table surface. Sometimes the reference for measuring the distance is a specific (side) portion of the router bit rather than the upper end surface thereof.

In another situation it is not the vertical projection of the router bit above the router table surface but rather the distance between a specific portion of the router bit tool and another reference surface, for instance a reference surface formed by the side of a router fence facing the router bit. The known device is not suited for measuring this distance. One may place the known device directly on the router table such that the feet of the tool are in contact with the router fence. However, it is only possible to measure the distance between the router fence and the router bit at table level. In practice, it is not the router bit at table level but rather the bit at a higher level that is to be used as reference for determining the distance to the router fence. Moreover, when using a lock miter bit on a router table, both the distance from the router fence and the distance from the table surface needs to be identical. This symmetry in distance is required at an exact spot on the cutting edge of the router bit which cutting edge is generally not at the table level.

SUMMARY OF THE INVENTION

It is therefore an object of the present invention to provide a device wherein at least some of the drawbacks of the existing tools are obviated or at least reduced.

The present invention, in part, relates in a first aspect, to a device for determining the distance of a cutting tool relative to a first reference surface or a second reference surface, the second reference surface extending essentially perpendicular to the first reference surface, the device comprising a central body, a pair of feet mounted to the central body, the feet being spaced apart so as to be able to accommodate between them the cutting tool, and a pointing element slidably arranged relative to the central body, wherein in a horizontal mode of operation when the feet are placed on or against the first reference surface, the pointing element may be moved relative to the central body to abut the cutting tool for determining the distance between the cutting tool and the first reference surface, wherein at least one of the feet is configured to set the height of the pointer element with respect to the second reference surface.

The cutting tool may be a router bit, a saw blade of a circular saw, or any suitable cutting tool for machining a workpiece. The device may be used to determine the distance between any portion of the cutting tool to a first reference surface, for instance a vertical surface, and a second reference surface, for instance a horizontal surface.

Any portion of the cutting tool may be used to determine the distance since in an embodiment the at least one of the feet is configured to shift the central body and the pointer mounted the central body in an essentially upward or downward direction to set the height of the pointer element. In some embodiments the at least one of the feet is rotatably mounted to the central body. When the at least one of the rotatably mounted feet has an essentially oval cross-section, the height of the pointer with respect to the second reference surface may be altered simply by rotating the at least one foot.

In an embodiment the pointer is formed by an elongated element with a substantially circular cross-section so that the feet of the device do not need to shift the central body in a symmetrical way in order to maintain a correct position of the pointer. If both feet are rotatably mounted to the central body and the feet are mounted to be rotated independently, the fine-tuning capability of the device may effectively be doubled.

In an embodiment the pointer has differently shaped ends. Depending on the shape of the cutting tool, or, more specifically, depending on the shape of the portion of the cutting tool that is to form the reference for determining the distance to the reference surface, a differently-shaped end of the pointer is used. If the pointer has one end formed by a plate-like element extending in a generally longitudinal axial direction, the element is relatively thin and may be accurately positioned at the specific portion.

The device may be configured to determine, in a first operational mode, the height of a predefined portion of the cutting tool relative to a horizontal reference surface (for instance a router table in case the cutter tool is a router bit) and in a second operational mode the distance of said predefined portion of the cutting tool with respect to a vertical reference surface (for instance a router fence).

The pointer may comprise a rule or scale to measure the distance. The measured distance may be expressed in units of distance (for instance, in [m]). The device may be used for measuring the distance between a positioned cutting tool and one or more reference planes and therefore can be considered a measuring device. Additionally or alternatively the device may be configured to determine the distance between the cutting device and one or more reference surfaces. This distance or any other predefined distance may be used to determine the distance at which the cutting tool is to be set relative to the one or more of the reference surfaces. The device in these embodiments is a cutting tool setting device.

According to another aspect the device is used for determining the distance at which a cutting tool is to be positioned relative to one or more reference surfaces. The use of the device may involve the determination of the distance between the cutting tool and the first reference surface, and the movement of the cutting tool and/or the second reference surface until the mutual distance between the cutting tool and the second reference surface corresponds to the determined distance between the cutting tool and the first reference plane.

BRIEF DESCRIPTION OF THE DRAWINGS

Embodiments of the invention will now be described by way of example only, with reference to the accompanying drawings, wherein:

FIG. 3a shows a side view of the embodiment of the device according to FIG. 2, in the start position substantially level with a horizontal reference plane; and FIG. 3b a side view of the embodiment of FIG. 3a in an elevated position.

DETAILED DESCRIPTION

The following detailed description of an embodiment of the present invention will be better understood when read in conjunction with the appended drawings wherein like references indicate similar elements.

Figure 1:
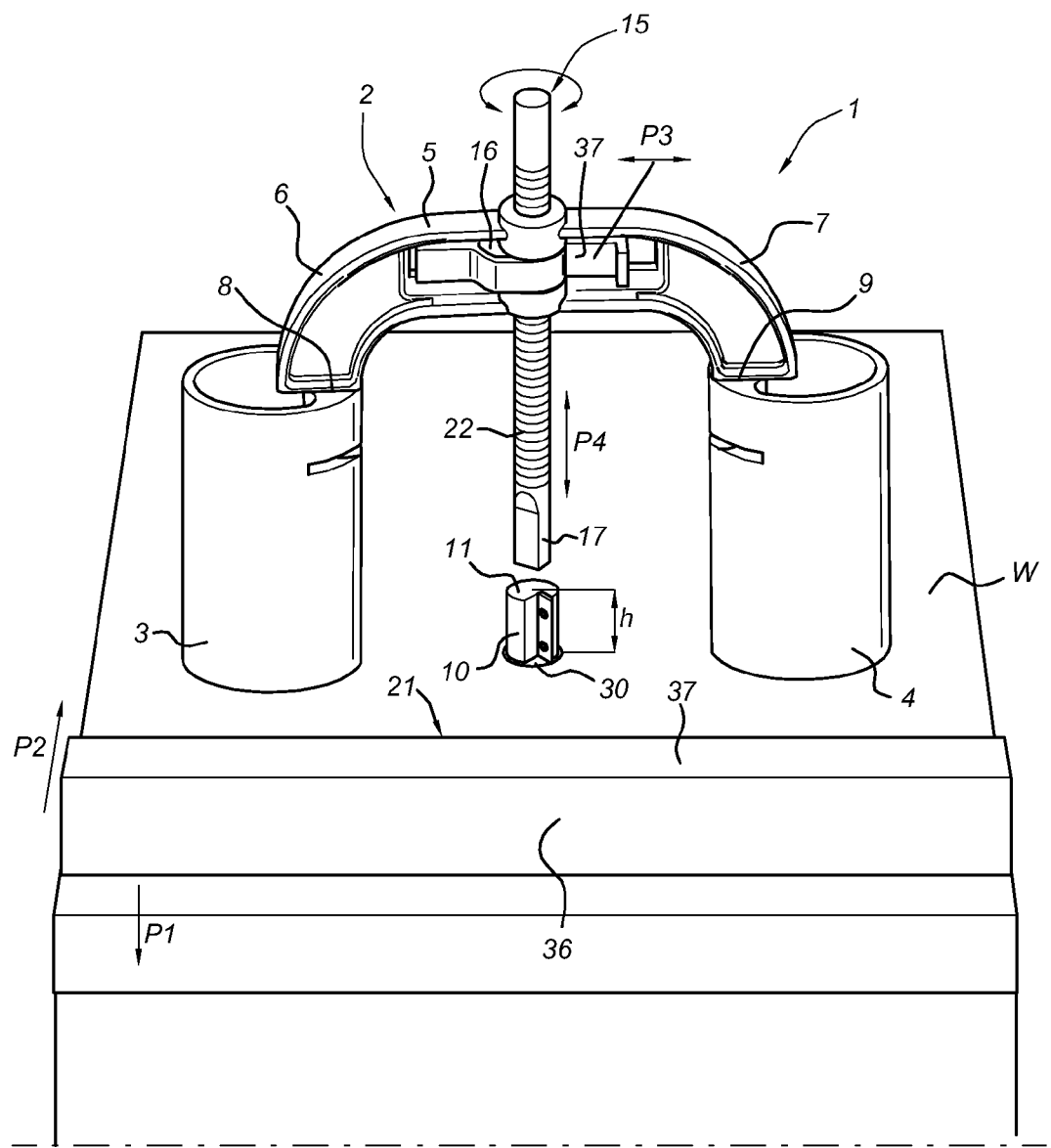
FIG. 1 shows a perspective view of a router table on which an embodiment of the device is placed in order to measure the height of the router bit.

FIG. 1 shows a router table including a frame and a table top W. The table top W is used to support a piece of material (for example a piece a wood) to be machined. A plunge or fixed based router for routing out (hollow out) an area in the face of the piece of material is arranged underneath the router table 1. The router (not shown in the figures) includes a base supported by the router table, the base housing a vertical mounted electric motor with a router collet on the end of its motor shaft. The router collet is supported by a frame that is positioned under the route table and is arranged to take up a router bit 10, which then extends through an aperture or opening 35 in the router table top W. The router table further includes a router fence or guiding fence (drawn in FIG. 1 with dotted lines) 36 that can be moved (directions $P_1$, $P_2$) along the side of the table top W. The router fence 36 can be used to guide the work piece to be machined during the routing out operation. The fence 36 determines a working direction and the position of the groove to be machined in the work piece. As mentioned before, the fence is movable from back to front of the table and may be secured to the table top W at any desired position using any type of means.

In order the measure the distance between the table top W and the upper surface 11 of the router bit 10, that is the height (H) of the router bit 10 above the table top, a measurement device 1 is positioned over the router bit 10. The device is used to measure the projection of the router bit from a reference surface, in this case from the table top W. The device 1 comprises a central body 2 which is formed of a central generally elongated element 5 provided at both ends with a curved elements 6 and 7. The curved elements 6, 7 are provided with respective feet 3 and 4 which are mounted in such a manner that they can turn relative to the central body. In the orientation shown in FIG. 1 the feet 3, 4 can be turned (rotated) along a vertical axis.

The central body 2 and the feet 3, 4 define an arch that may be placed over the router bit 11. In the central body 2 extends an elongated element 15, herein also referred to as the pointer or pointer pin 15, that may be secured to the central body 2 by a locking mechanism (to be described later).

Referring to FIG. 1, in an embodiment the locking mechanism is based on clamping action and may clampingly fix the pointer pin to the central body 2. In the open position of the locking mechanism the pointer pin 15 can be slid easily upward or downward direction $P_4$), while in the closed position of the locking mechanism the pointer pin can still be slid but will be substantially remain in any required position if no sliding force is applied to it. In other embodiments the pointer pin 15 is provided with an external thread so that the pin may be moved upward or downward by rotating the same.

An embodiment of the locking mechanism of the device is schematically shown in FIG. 1 and comprises a handle 37 in which an elongated opening 16 is formed allowing the handle 37 to be moved along the external body 5 (direction $P_3$) in order to open or close the same. The shape of opening 16 tapers to one end thereof, thereby allowing the pointer pin to be moved freely upward and downward when the handle is in one position while clamping the pointer pin 15 to the external body when it is in the opposite position.

In a vertical mode of operation, the device is arranged substantially vertically and the pointer pin is positioned at the required height by either pushing it down or rotating it so that it moves in a downward direction onto the upper surface 11 of the router bit. Using the scale 22 provided on the side of the pointer pin 15, the value of the distance between the upper surface 11 of the router bit and the table surface can be determined easily.

Alternatively, the pointer pin 15 may be moved vertically while it is held in the central part of the device, and be set at a particular height with the help of graduation marks (not shown in the figures) on the pointer pin 15 or at a height predetermined with the help of an external measuring device, such as a calliper, set up blocks, etc. In the latter case the router bit 10 can now be moved upward until it reaches the bottom side of the pointer 15. Once the router bit has reached the bottom side, the required height of the router bit has been reached.

Figure 2:
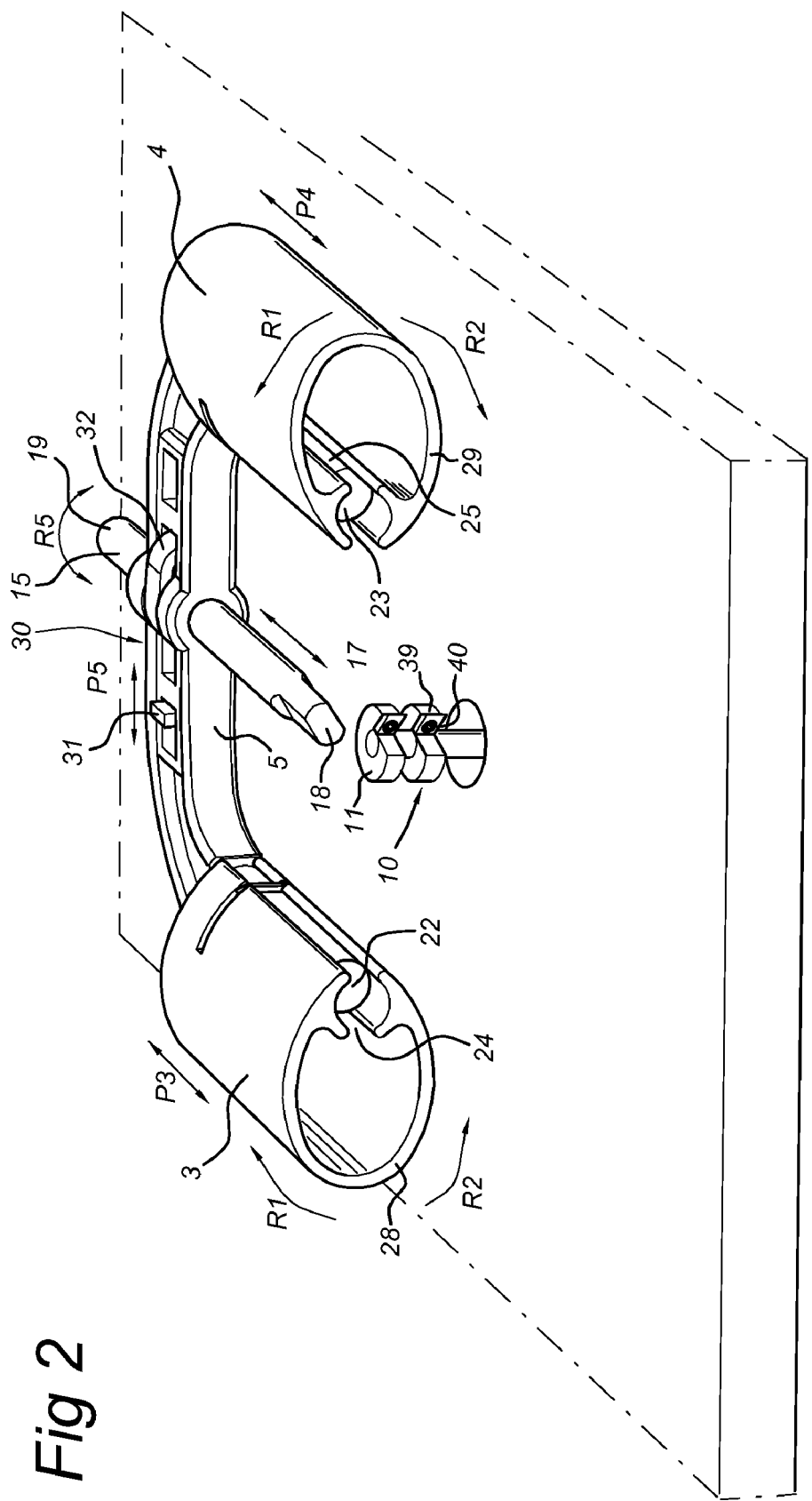
FIG. 2 shows a perspective view of the device of FIG. 1, in a horizontal position in order to measure the distance between the router bit and a vertical reference plane.

FIG. 2 shown the same embodiment as in FIG. 1, but in a horizontal mode of operation. In this mode of operation the distance is determined between a vertical reference surface, for instance a side surface 21 of the router fence 36, the side surface 21 facing the router bit 10, and a predetermined portion of the router bit 10, for instance the protruding element 39 thereof. The element 39 extends at a certain distance above the upper surface W of the router table. If the distance between the router fence and the router bit 10 is to be measured in the situation as shown in FIG. 3a, the bottom surface 18 of the pointer pin 15 will not reach the protruding element 39, but will touch another portion 40 of the router bit 10 instead. In order to be able to measure the distance at a predefined height above the table surface W, the device is elevated by turning one or more of the rotatable feet 3, 4 mounted to the central body 5 thereof. The rotatable feet 3, 4 are connected to the curved portions 6, 7 of the central body 5 through the hinges 8, 9 provided at a side of each of the feet 3, 4. The feet furthermore have in cross-section an general oval shape, resulting in an increase or decrease of the distance between the pointer pin 15 and the table surface when either of these feet 3 or 4 is rotated. Moreover, the elevation of the pointer pin 15 above the table surface is independent of the distance measured in the vertical mode of operation, i.e. the setting of the pointer pin 15 as a result of a measurement in the vertical mode of operation does not need to be altered when the distance in the horizontal plane is measured.

In the situation shown in FIG. 3b, the left foot 3 is turned in a first direction ($R_1$) to the orientation shown in FIG. 3b. The right foot 4 is similarly rotated in a second direction ($R_2$) to arrive in the situation shown in FIG. 3b. In this situation the pointer pin 15 has been elevated to the required height ($H_a$) (cf. 3b) so that the bottom surface 18 of the pointer pin 15 may touch the protruding portion 39 so that the distance between this portion 39 and the fence 36 can be determined.

In the shown embodiment the pointer pin 15 has a generally round cross-section, so that the feet 3, 4 do not have to be turned in to the same extent to maintain a correct position of the pointer pin relative to the router bit 10. Furthermore, the pointer pin 15 has one substantially flat end and one end provided with a plate-like element or lip 18 extending in a generally axial direction. The pointer pin 15 furthermore can be introduced from either end into the opening 12 provided in the central body 5 so that the measurement can be preformed using either of the ends 17 or 19 of the pointer pin 15. Moreover, the pointer pin 15 is arranged in the central body so as to be rotatable (direction $R_5$). This enables the orientation of the plate-like end 17 of the pointer pin 15 relative to the router bit 10 to be set by simply rotating the same. Depending on the shape of the router bit, a differently shaped outer end of the pointed pin 15 may be used in order to determine the distance at the correct portion of the router bit.

In an embodiment the length of the pointer pin 15 is selected to be a multiple times a predetermined unit of length, for instance inch or centimetre. Furthermore, notches are provided in the outer surface of the pointer pin at constant mutual distances so that the distance from the cutting tool to the outer end of the pointer pin can be determined easily and independent of the orientation of the pointer pin (i.e. independent of which pointer end faces the cutting tool).

The device 1 may be made of a plastic or nylon curved body and two feet made of extruded aluminium. However, any other suitable types of material, for instance steel and/or wood, may be used instead.

The embodiment of the device can be used in the same manner in the horizontal and vertical mode of operation. In the horizontal mode of operation it may be necessary—in particular in the case of positioning router bits at the correct distance from a router fence—to measure a specific part or portion of the router bit's anatomy, which generally is not at the table level. For this usage, being able to elevate the embodiment of the device to the required height is extremely useful and contributes to a precise and successful set-up operation. This latter operation is of particular relevance when operating a so-called tongue and groove or cope and stick combination of router bits, which are used in matched pairs. In this case, the set-up of the first router bit of such a pair determines the exact vertical position of the second. Recording its height with the device may facilitate the exact set-up of the second router bit. Likewise, when using a Lock Miter Bit on the router table, the set-up of this bit may be facilitated with an embodiment of the device presented here as the exact distance from the fence and the table surface needs to be identical. This symmetry in distance, however, is required at an exact spot on the cutting edge of the bit, and this can be successfully registered with the device at a precise distance from the table surface.

Further advantages of at least some of the embodiments of the device presented include:
1. It can be used both horizontally as well as vertically.
2. It has a rounded pointer pin with one knife edge end
3. The locking device is both simple and effective, consisting of a simple sliding piece, allowing the pointer pin to be locked, but still to be moved up or down without slack or backlash.
4. This tool has two sturdy feet made of aluminium extrusion, offering stability when used vertically and—thanks to their oval shape and free turning around their axis—the possibility to alter the height of the pointer pin for certain measurements off the table surface.

In the present description reference is made to a device that is primarily, but not exclusively, aimed at usage in woodworking, notably on a router table, or a table saw. However, on other embodiments of the invention the device is aimed at different types of cutting tools.

Although the invention has been described with reference to a specific embodiment thereof, it will be appreciated that the invention is not limited to these embodiments and that changes and modifications to the device described herein may be made without departing from the invention. The rights applied for are defined by the following claims.

The invention claimed is:

1. A device for determining the distance of a cutting tool, for instance a router bit, relative to a first reference surface or a second reference surface, the second reference surface extending essentially perpendicular to the first reference surface, the device comprising a central body, a pair of feet mounted to the central body, the feet being spaced apart so as to be able to accommodate between them the cutting tool, and a pointing element slidably arranged relative to the central body, wherein in a horizontal mode of operation when the feet are placed on or against the first reference surface, the pointing element may be moved relative to the central body to abut the cutting tool for determining the distance between the cutting tool and the first reference surface, wherein at least one of the feet is configured to set the height of the pointer element with respect to the second reference surface, wherein the at least one of the feet is rotatably mounted to the central body and is shaped so as to change the height of the pointer with respect to the second reference surface by rotation thereof.

2. The device as claimed in claim 1, wherein the at least one of the feet is configured to shift the central body and the pointer mounted the central body in an essentially upward or downward direction to set the height of the pointer element.

3. The device as claimed in claim 1, wherein the pointer is formed by an elongated element with a substantially circular cross-section.

4. The device as claimed in claim 1, wherein the at least one of the feet has an essentially oval cross-section.

5. The device as claimed in claim 1, wherein both feet are rotatably mounted to the central body and wherein the feet may be rotated independently from one another.

6. The device as claimed in claim 1, wherein the pointer has differently shaped ends.

7. The device as claimed in claim 6, wherein the pointer is an elongated element comprising a first element end having a first shape and a second element end having a second shape, different from the first shape.

8. The device as claimed in claim 7, wherein the first element end is formed by a plate-like element extending in a generally axial direction.

9. The device as claimed in claim 7, wherein the second element end is formed by a substantially flat surface extending in a generally radial direction.

10. The device as claimed in claim 1, wherein the pointer comprises a rule or scale.

11. A method for measuring a distance between a positioned cutting tool and one or more reference planes, comprising measuring the distance between a positioned cutting tool and one or more reference planes using the device according to claim 1.

12. A method for determining a distance at which a cutting tool is to be positioned relative to one or more reference surfaces, comprising determining the distance at which the cutting tool is to be positioned relative to one or more reference surfaces using the device according to claim 1.

13. A method for positioning a cutting tool relative to a first reference surface and a second reference surface, comprising:
   determining the distance between the cutting tool and a first reference surface using the device of claim 1; and
   moving the cutting tool and/or the second reference surface until a distance between the cutting tool and the second reference surface corresponds to the determined distance between the cutting tool and the first reference surface.

* * * * *